United States Patent [19]

Paeye et al.

[11] Patent Number: 4,686,836
[45] Date of Patent: Aug. 18, 1987

[54] THERMAL ENERGY COLLECTOR AND SYSTEM INCLUDING A COLLECTOR OF THIS KIND

[75] Inventors: Gerard Paeye, Carquefou; Alain Guiader, Nantes, both of France

[73] Assignee: Jeumont-Schneider Corporation, Puteaux cedex, France

[21] Appl. No.: 805,091

[22] Filed: Dec. 4, 1985

[30] Foreign Application Priority Data

Dec. 6, 1984 [FR] France .............................. 84 18635

[51] Int. Cl.⁴ ........................................... F25B 27/00
[52] U.S. Cl. ................................. 62/235.1; 62/478; 62/480; 165/104.12
[58] Field of Search ................... 62/235.1, 477, 478, 62/480; 165/104.12

[56] References Cited

U.S. PATENT DOCUMENTS

| | | | |
|---|---|---|---|
| 1,169,675 | 1/1916 | Pfleiderer | 62/478 |
| 3,018,087 | 1/1962 | Steele | 165/104.21 |
| 4,586,345 | 5/1986 | Friberg et al. | 62/477 |

FOREIGN PATENT DOCUMENTS 436402 10/1935 United Kingdom .................. 62/477

*Primary Examiner*—Albert W. Davis, Jr.
*Attorney, Agent, or Firm*—Rines and Rines, Shapiro and Shapiro

[57] ABSTRACT

A two terminal control switch having a main switch and a saturable current transformer whose primary winding is series connected with the main switch. A center tapped full wave rectifier has a capacitor connected between its DC sides, such capacitor also being connected to a junction between the primary winding and the main switch.

9 Claims, 2 Drawing Figures

THERMAL ENERGY COLLECTOR AND SYSTEM INCLUDING A COLLECTOR OF THIS KIND

This invention pertains an improvement in thermal energy collectors which, for example, are used in systems where the mode of operation includes a phase consisting of adsorption of a fluid by a given material and a subsequent desorption phase, as in the instance of cooling systems of the solar type.

A thermal energy collector of this type has, for example, been described in the patent application which has been filed in France under patent application No. 84 05866 and which provides a description of a thermal energy collector for a system of adsorption-desorption. The aforementioned thermal energy collector consists of a compartment, the inner portion of which is lined with a material characterized by significant adsorptive or desorptive capabilities.

The compartment of the prior collector is essentially formed by two surfaces situated opposite each other: the uppermost surface, which is exposed to the energy source, and the bottom surface, which is usually connected to a duct joining the collector to other portions of the cooling system in order to allow circulation of fluid.

In order to improve the productivity of the adsorbent-desorbent material, a space is provided between the adsorbent-desorbent material and the bottom surface of the compartment. A supporting layer with suitable openings is positioned under the adsorbent-desorbent material in order to hold the latter in place against the uppermost surface.

The aforementioned system operates in such a manner that, as a result of desorption when thermal energy is transmitted to the collector, the material placed inside the collector shall release fluid which it contains, the released fluid being in the form of vapors which enter previously mentioned duct. In the absence of thermal energy, the aforementioned material shall adsorb fluid entering the collector from the duct. The duct links the collector to a circuit which contains a fluid; and both the collector and the circuit are hermetically closed and free of air.

The circuit includes an evaporator positioned inside an insulating chamber. A pipe connects the evaporator to the duct by means of a trap, whereas another pipe connects the duct to the uppermost portion of a and another pipe connects the bottom portion of the condenser to the uppermost portion of the evaporator.

A system which includes a collector of the aforementioned kind shall, therefore, comprise various elements linked together by means of ducts. As a result, the manufacturing cost and leakage hazards of the system are relatively high.

The purpose of this invention is to overcome these difficulties by means of a simple modification in thermal energy collectors containing adsorptive or desorptive materials of the type cited heretofore.

The principal advantages derived from this particular invention are a substantial decrease in the manufacturing cost of the system which includes a collector of this type, an increase in the reliability of the system and a reduction in the loss of charge during the adsorption phase.

In summary the invention pertains to a thermal energy collector consisting of a compartment whose uppermost surface shall be exposed to a source of thermal energy, whereas the bottom surface is usually connected to a duct joining this compartment to the rest of the cooling system. In turn, a material which is sufficiently capable of adsorbing and desorbing fluids shall be placed between these two surfaces. In accordance with this invention a space must be provided between the adsorptive-desorptive material and the bottom surface of the aforementioned compartment. A supporting layer with suitable openings shall be placed beneath this adsorptive-desorptive material in order to ensure that it shall be held in place against the previously cited upper surface.

According to this invention a condenser shall be mounted directly on the bottom surface of the compartment. Said condenser may, for example, include fins situated in a position perpendicular to the bottom surface.

It shall be possible to understand this invention more fully, as well as other purposes, advantages, and characteristics of said invention, in relation to the description provided hereinafter, which is accompanied by a set of drawings showing an example of the invention.

Figure 1:
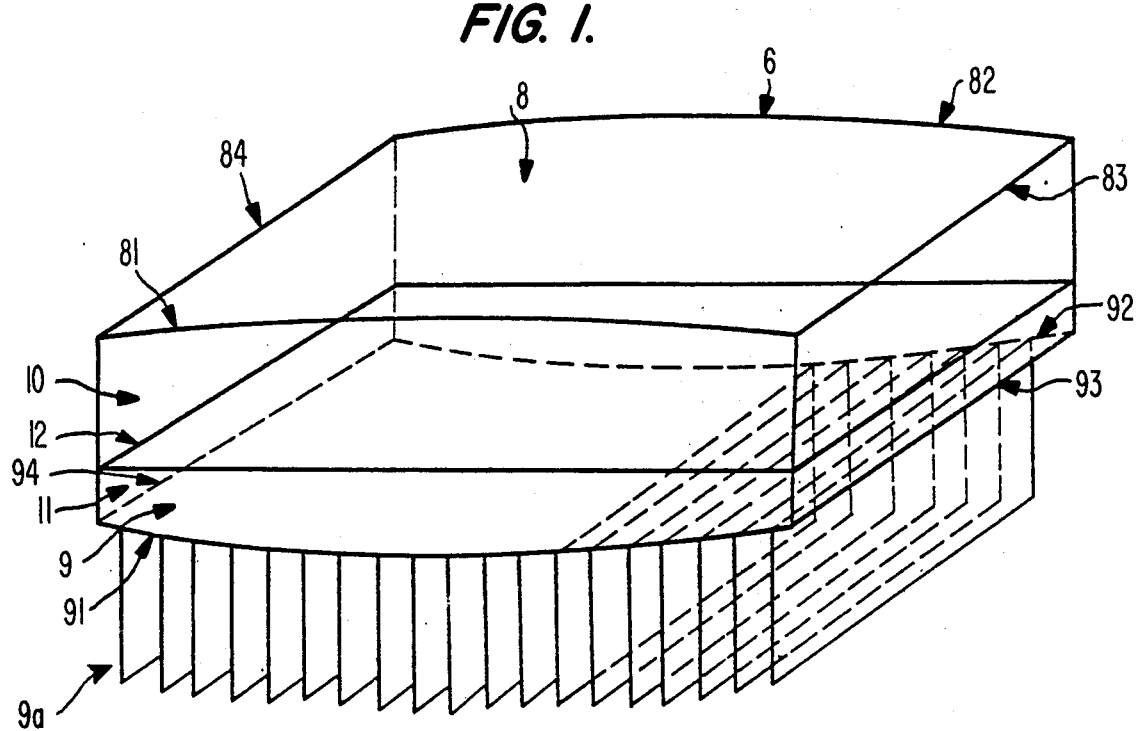
FIG. 1 is a diagram of a thermal energy collector designed in accordance with this invention.

Referring to the drawings, a collector (6) consists of a compartment which is preferably composed of copper or aluminum. The compartment is essentially formed by two surfaces situated opposite each other, namely an upper surface (8) which is exposed to a source of thermal energy and a bottom surface (9). The inner portion of this compartment (6) is lined with a material (10) characterized by significant fluid adsorption or desorption capabilities, such as zeolite, which is a microporous aluminosilicate compound, with water preferably being used as the fluid in this particular instance. The aforementioned material can also consist of activated charcoal, with methanol preferably being used as the fluid in that instance. A space (11) is provided within the collector (6) between the aforementioned material (10) and the inner surface (9). A supporting layer (12) ensures that this material (10) shall be held in place against the uppermost surface (8). It is possible for the supporting layer to be held in place by means of laterally arranged shims, for example. Inasmuch as the lining material (10) is light, it is possible for the shims to be placed solely against the inner walls of the compartment. In turn, a grid or a perforated sheet for example can be used as a supporting layer (12). The holes within this supporting layer should be arranged so that it is impossible for the lining material (10) to fall into the space identified as (11), although there should be sufficient permeability in relation to the fluid.

For the sake of clarity in FIG. 1, only the intersections between the supporting layer (12) and the lateral walls of the collector (6) have been represented.

Preferably surfaces (8) and (9) shall have a slightly concave configuration. The inside of the compartment shall be partially transformed into a vacuum. This shall indeed generate certain constraints to which the aforementioned compartment shall be subjected. Said constraints shall be reduced as the result of a change in favor of the aforementioned configuration. The same principle applies in the case of a convex configuration of surfaces (8) and (9). Thus, the boundaries of surfaces (8) and (9) of the compartment are represented by two curved lines (81,82,91,92) and by two straight segments (83,84,93,94).

In accordance with the invention, a plurality of fins (9a) may be positioned substantially perpendicular to the bottom surface (9). The fins, along with the space provided (11) and the aforementioned bottom surface (9), form a condenser (3). The number and surface area of said blades are determined in a manner such that the result to be obtained shall be a condenser with a given performance level.

In FIG. 1, the hidden sides of only a few blades have been represented in dotted lines; this is for the purpose of clarity.

Figure 2:
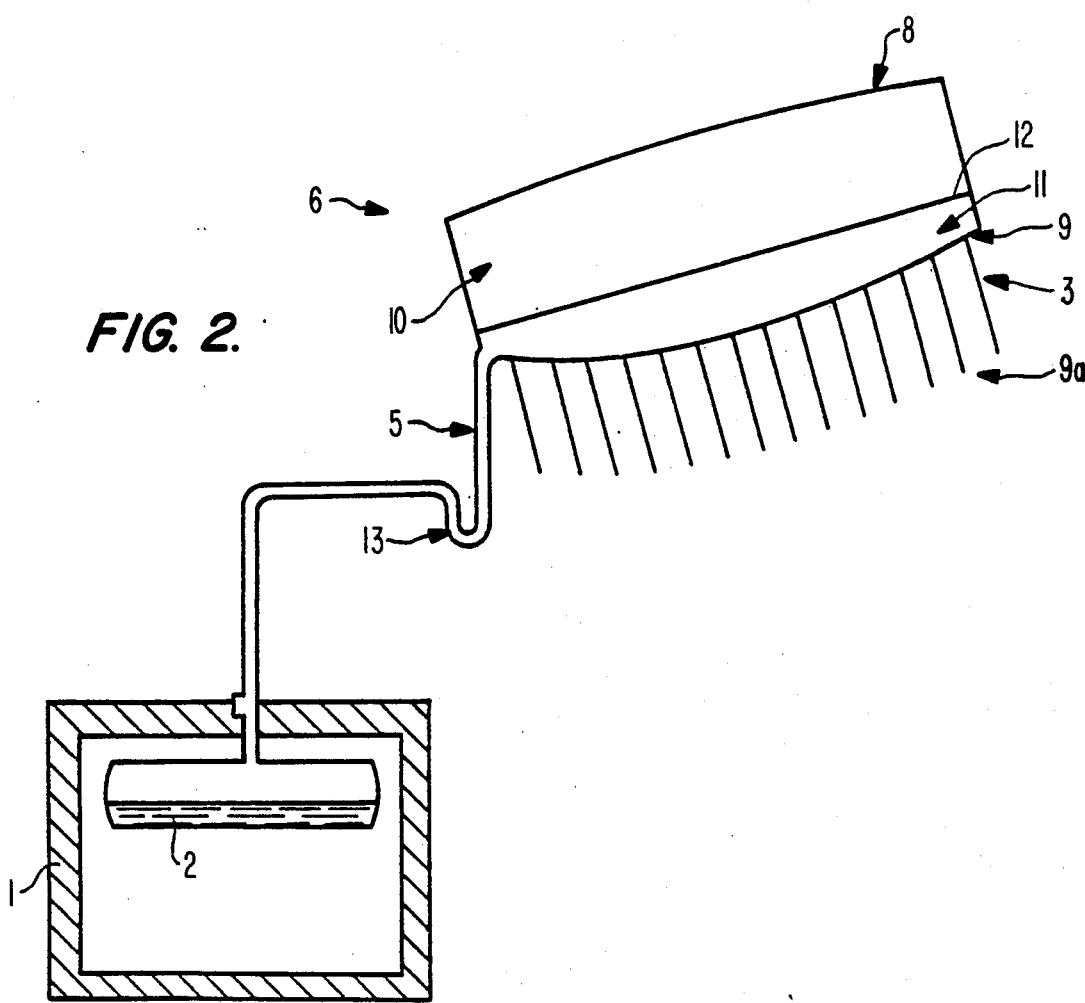
FIG. 2 is a general diagram of a thermally powered cooling system containing a collector designed in accordance with this invention.

In reference to FIG. 2, the collector (6) is linked by a duct (5) to an evaporator (2) situated in an insulating chamber (1). Said duct (5) links the existing space (11) to the evaporator (2). The collector is positioned in such a manner that the point of junction between the collector and the duct (5) shall be the lower point of the collector.

The cooling system of FIG. 2 operates by means of intermittent supplying of thermal energy (in this instance thermal energy shall be of solar origin). In the presence of thermal energy, temperature and pressure levels inside the collector (6) steadily increase. The lining material (10) releases fluid by desorption, the released fluid being in the form of vapor. Vapor released during this initial phase condense on the surface (9) of the collector compartment and flow into the duct (5).

According to the preferred method, the duct (5) shall comprise a system, the purpose of which is to prevent the flow of vapor directly from the space (11) into the evaporator (2). Due to the lower level of pressure in the evaporator than in the condenser, this system may be designed on the principle of a trap. In the form shown, the first condensed vapors flow through the duct (5) into a trap (13), thus obstructing the duct (5). The vapor shall continue to condense in the condenser (3) and, with the force of gravity, the condensed vapor shall reach the evaporator (2). A system for the aforementioned purpose may also be designed on the basis of a value or other similarly functioning means.

In the absence of a supply of thermal energy, the temperature of the material identified as (10) will decrease, and pressure within the condenser (3) and the collector (6) shall likewise decrease. At this time, the aforementioned material (10) will adsorb (in vapor form) fluid which has accumulated inside the trap (13), as well as fluid contained within the evaporator (2). Hence, the pressure inside the evaporator will change. Because the circuit is hermetically sealed and because the evaporation process is endothermic, fluid remaining within the evaporator (2) will solidify. In this way, a temperature of approximately 0° C. can be maintained within the insulating chamber (1), even after adsorption has been completed. This adsorption phase which produces cooling shall continue until additional thermal energy is supplied.

It will be appreciated that, as a result of the modification of the collector, a system which includes the collector will be much less costly to manufacture than a system which includes a classical type of collector. A system with the improved collector described herein indeed comprises one less independent element since both the collector and the condenser are combined in one unit. Consequently, the system requires fewer junction ducts. These two facts contribute to a substantial increase in the reliability of the system.

Moreover, a classical type of energy collector is thermally insulated on the surfaces which are not exposed to the source of energy in order to operate more efficiently. In the case of the energy collector which is the subject of this invention, the bottom surface need not be thermally insulated. Indeed, the removal of heat shall actually take place by means this surface and for instance by means of the fins which are affixed to the surface. For this reason the manufacturing cost of a collector designed in accordance with this invention may be lower than the cost of manufacturing a classical type of collector.

Finally, the removal of a junction duct between the collector (6) and the condenser (3), in the case of the energy collector which is the object of this invention, permits the design of the cooling system with a simplified junction duct (5) between the collector (6) and the evaporator (2). This leads to a reduction in the charge loss imposed on the fluid during the adsorption phase, that is, as the fluid travels from the evaporator to the collector.

Although only certain embodiments of the present invention have been described, it is obvious that modifications may be introduced by persons possessing sufficient technical knowledge, which modifications would not constitute a departure from the invention. For example, it would be advantageous to add a thermal resistance to the lateral walls of the collector between the uppermost surface (8) and the bottom surface (9) in order to avoid any heat transmission between these two surfaces. Such resistance may be obtained by cutting the lateral sides of the compartment under the level of the supporting layer (12) in a direction substantially parallel to the bottom and upper surfaces of the compartment and by inserting in the space thus created a polymer joint, nevertheless, without having to increase the dimensions of said collector.

Moreover, the shape and position of the fins (9a) of the condenser (3) may be of any suitable arrangement. Similarly, the fins may be eliminated if the bottom surface of the compartment were to be immersed in a fluid that had the characteristic of transmitting heat, with a given efficiency factor to bring about the desired cooling level.

I claim:

1. In an adsorption-desorption solar energy collector having a compartment defined by an upper surface to be faced toward the sun, and a bottom surface spaced from the upper surface and joined thereto by sidewalls of the compartment, there being contained within the compartment an adsorbent-desorbent material, the improvement wherein:
    said material is supported against said upper surface and spaced from said bottom surface by a layer having opening means for permitting vaporized working fluid to flow to and from said material,
    said bottom surface constitutes a condenser surface for condensing desorbed vapors from said material, and
    said bottom surface further has an opening disposed for permitting condensed liquid to flow out of said collector.

2. The improvement of claim 1, wherein a plurality of fins project outward of said collector from said bottom surface.

3. The improvement of claim 2, wherein said fins are substantially perpendicular to said bottom surface.

4. The improvement of claim 1, wherein said upper surface and said bottom surface are slightly concave.

5. The improvement of claim 1, wherein said material is zeolite and wherein said working fluid is water.

6. The improvement of claim 1, wherein said material is activated charcoal and wherein said working fluid is methanol.

7. The improvement of claim 1, wherein said sidewalls of said compartment incorporate means for resisting heat flow between said upper surface and said lower surface through said sidewalls.

8. The improvement of claim 7, wherein said heat flow resisting means comprises a polymer joint formed in said sidewalls.

9. In a cooling system having an adsorption-desorption solar energy collector, an evaporator situated within an insulated chamber, and means linking the collector and evaporator for transferring a working fluid therebetween, the improvement wherein:

said collector has an adsorbent-desorbent material supported against an upper surface of said collector and spaced from a bottom surface of said collector upon a layer having openings permitting flow of said working fluid in a vaporized state to and from said material, said bottom surface of said collector constitutes a condenser surface for condensing desorbed vapors from said material, said bottom surface has an opening connected to a duct which interconnects said collector and said evaporator, and said collector is oriented such that said opening of said bottom surface is substantially the lowest point of said collector.

* * * * *